United States Patent [19]

Nakanishi et al.

[11] Patent Number: 4,854,346

[45] Date of Patent: Aug. 8, 1989

[54] CONTROL APPARATUS FOR MANIFOLD TYPE ELECTROMAGNETIC VALVE DEVICE

[75] Inventors: Koji Nakanishi; Mituo Yoshino, both of Chiba; Yoshitane Saito, Kyoto, all of Japan

[73] Assignees: Kuroda Seiko Co. Ltd., Kanagawa; Nakamura Kiki Engineering Co., Kyoto, both of Japan

[21] Appl. No.: 234,745

[22] Filed: Aug. 22, 1988

[30] Foreign Application Priority Data

Aug. 31, 1987 [JP] Japan .................................. 62-230734

[51] Int. Cl.$^4$ .................................................... F16K 11/10
[52] U.S. Cl. .................................... 137/624.11; 364/140
[58] Field of Search ........................ 137/624.11, 624.18, 137/624.2; 364/140

[56] References Cited

U.S. PATENT DOCUMENTS 4,562,552 12/1985 Miyaoka ................... 137/624.11 X
4,729,106 3/1988 Rush ........................ 137/624.11 X Primary Examiner—Alan Cohan
Attorney, Agent, or Firm—Peter J. Georges

[57] ABSTRACT

An apparatus for controlling a plurality of electromagnetic valves of manifold type including a parallel-in/serial-out unit for convert parallel control signals for a plurality of electromagnetic valves into a serial control signal and generating a composite control signal including the serial data signal, a start synchronous signal synchronized with the serial data signal and a driving voltage, a synchronous signal receiving circuit arranged on a manifold for generating a start signal in response to the control start synchronous signal supplied from the parallel-in/serial-out unit, a plurality of driver circuits each arranged on respective electromagnetic valves, a first driver circuit receiving said start signal supplied from said synchronous signal receiving circuit to convert the serial control signal into parallel control signals for driving the relevant electromagnetic valves and after driving the electromagnetic valves, said driver circuit producing an end signal, a synchronous signal transmitting circuit arranged on said manifold, the synchronous signal transmitting circuit receiving said end signal and supplying the synchronous signal, and three wires for transmitting the composite signal, start signal, end signal and synchronous signal among the parallel-in/serial-out unit, synchronous signal receiving circuit and synchronous signal transmitting circuit.

8 Claims, 5 Drawing Sheets

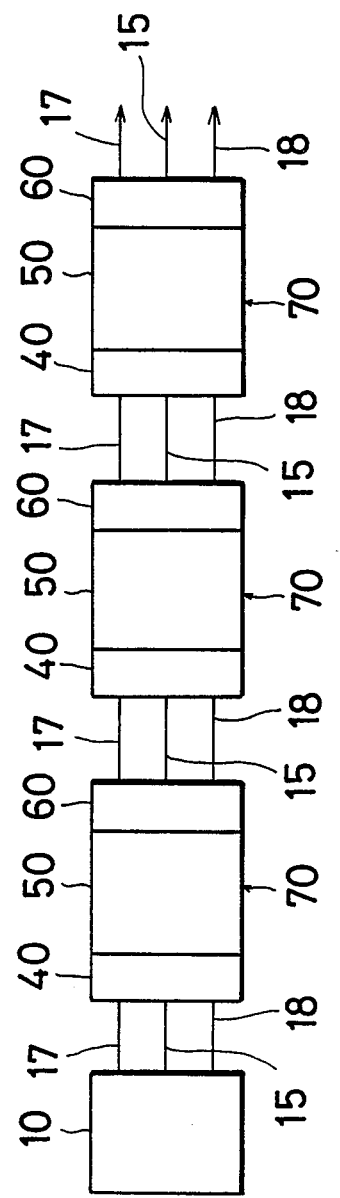

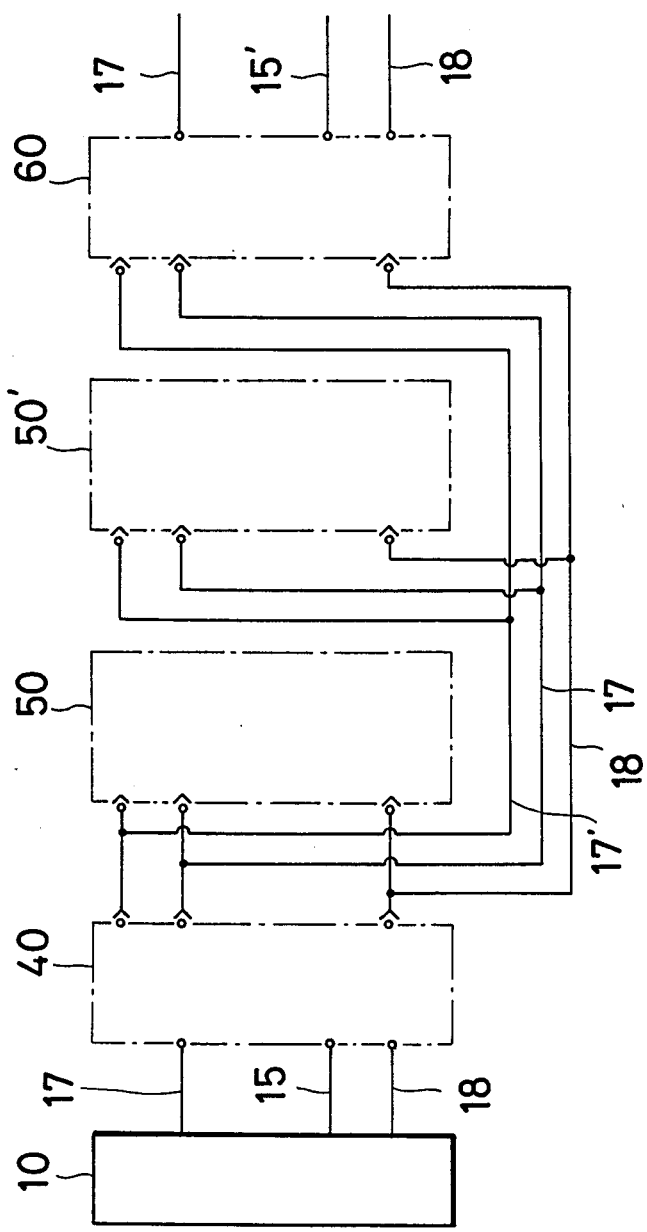

CONTROL APPARATUS FOR MANIFOLD TYPE ELECTROMAGNETIC VALVE DEVICE

BACKGROUND OF THE INVENTION

Field of the Invention and Related Art Statement

The present invention relates to an apparatus for controlling fluid pressure such as air pressure and oil pressure in a manifold type electromagnetic valve system having a plurality of electromagnetic valves.

In a fluid control system using a plurality of electromagnetic valves for controlling air pressure and oil pressure, respective electromagnetic valves and driving devices or controlling devices are connected to each other by means very complicated conduits. In order to simplify the connecting operation as well as to reduce a required space, there is some times used a manifold type electromagnetic valve system including a number of electromagnetic valves arranged on a common manifold base. In general, respective electromagnetic valves of the manifold type electromagnetic valve system are controlled by making on and off electric currents to solenoids of the electromagnetic valves. In the known manifold type electromagnetic valve system, the on and off operations of the solenoids are effected by controlling the driving power to the solenoids. That is to say, when the driving power is not supplied to a solenoid of an electromagnetic valve, the electromagnetic valve is closed or opened.

Therefore, to respective electromagnetic valves there have to connect two electric wires for conducting the driving power to the electromagnetic valves of single solenoid type arranged on the manifold base, there are arranged twenty electric wires, and when ten electromagnetic valves of double solenoid type are arranged, there have to be provided forty electric wires. In this manner, a quite large number of electric wires have to be connected to the manifold type electromagnetic valve system. This wiring operation requires very high cost and a large space for arranging a large bundle of electric wires. Moreover, when malfunction occurs due to the breakage or defects in contact, it is difficult to find positions of defects, so that it takes a quite long time until the manifold type electromagnetic valve system is repaired.

In order to avoid such a disadvantage there has been proposed a system in which the on-off control signals for respective electromagnetic valves are converted into a serial signal which is supplied via a single signal wire to the manifold and the driving power for the solenoids is supplied via a pair of power wires. In this case, to the manifold there are connected only three electric wires, two wires for the power supply and one wire for the control signal.

In the known system explained above, the serial control signal is reconverted into parallel control signals and these control signals are parallelly supplied to respective solenoids via respective control signal wires. Therefore, there must be arranged a plurality pairs of control signal wires the number of which is equal to that of the electromagnetic valves. Moreover, there must be arranged a serial-parallel converter and I/O ports for allotting the parallel control signals to respective electromagnetic valves. This results in that the manifold becomes large in size, so that the above mentioned solution could be hardly applied to the small size electromagnetic valve system. Further, since the wiring is complicated, there might occur breakage and poor connection of the wires and it is still difficult to find causes of malfunction so that it takes rather long time period until the manifold type electromagnetic system is repaired.

As explained above, the known solution requires rather complicated operation for arranging the serial-parallel converter on the manifold, and the effect could not be attained to an expected extent. Moreover, when it is required to provide another manifold system being coupled with the manifold system, it is necessary to provide transmitter unit and receiver unit for transmitting the control signal between these manifold systems. This results in that the whole system becomes further large in size.

SUMMARY OF THE INVENTION

The present invention has for its object to provide a novel and useful apparatus for controlling a number of electromagnetic valves simultaneously, in which the whole apparatus can be made small in size, the wiring operation can be effected simply, and a plurality of manifolds can be coupled with each other easily.

According to the invention, an apparatus for controlling electromagnetic valves of manifold type comprises means for generating parallel control signals for a plurality of electromagnetic valves; a constant voltage source for producing a constant voltage; a parallel-in/serial-out unit for converting said parallel control signals into a serial data signal and generating a composite control signal including said serial data signal, a start synchronous signal synchronized with said serial data signal and a driving voltage formed from said constant voltage; at least one synchronous signal receiving circuit arranged on a manifold, said synchronous signal receiving circuit generating a start signal in response to said control start synchronous signal supplied from said parallel-in/serial-out unit; a plurality of driver circuits each arranged on respective electromagnetic valves, a first driver circuit receiving said start signal supplied from said synchronous signal receiving circuit to convert the serial control signal into parallel control signals for driving the relevant electromagnetic valves and after driving the electromagnetic valves, said driver circuit producing an end signal; at least one synchronous signal transmitting circuit arranged on said manifold, said synchronous signal transmitting circuit receiving said end signal and supplying the synchronous signal; and means for transmitting the composite signal, start signal, end signal and synchronous signal among said parallel-in/serial-out unit, synchronous signal receiving circuit and synchronous signal transmitting circuit.

BRIEF EXPLANATION OF THE DRAWINGS

FIG. 4 is a block diagram depicting an embodiment of the control apparatus according to the invention; and FIG. 5 is a block diagram showing another embodiment of the control apparatus according to the invention.

DESCRIPTION OF THE PREFERRED EMBODIMENTS

Figure 1:
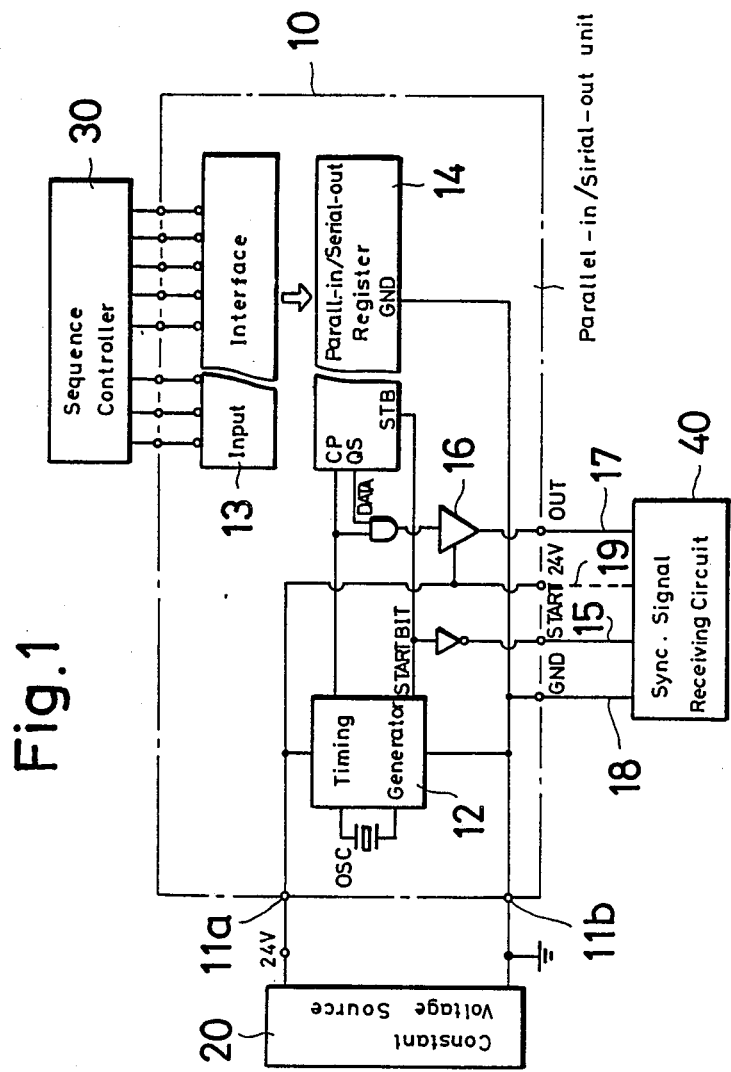
FIG. 1 is a block diagram showing the construction of the parallel-in/serial-out unit of the electromagnetic valve according to the invention.

FIG. 1 is a block diagram showing an embodiment of the manifold type electromagnetic valve controlling apparatus according to the invention. The apparatus comprises a parallel-in/serial-out unit 10 having power input terminals 11a and 11b to which is connected a constant voltage source 20. The constant voltage source 20 can supply the power to the whole system and has such a capacity that all solenoids of the electromagnetic valves can be energized. The parallel-in/serial-out unit 10 converts parallel control signals supplied from a sequence controller 30 into a serial control signal, and supplies the thus converted serial control signal to a synchronous signal receiving circuit 40 provided on the manifold via three conductor wires 15, 17 and 18. The parallel-in/serial-out unit 10 comprises a timing generator 12 for generating clock pulses for attaining the synchronization with the control signal, an input interface 13 for producing the output control signal from the sequence controller 30, and a parallel-in/serial-out register 14 for converting parallel signals into a serial signal.

DC voltage of, for instance 24 volts, is applied to the parallel-in/serial-out unit 10 to energize the timing generator 12. Then the timing generator 12 generates clock pulses having amplitudes of 12 and 24 volts. The clock pulses are supplied to an input CP of the parallel-in/serial-out unit 10. At the same time, the control signals from the sequence controller 30 are supplied to the input interface 13 and are then supplied as the parallel signals to the parallel-in/serial-out register 14. The register 14 converts the parallel signals into the serial signal. The serial control signal is so constructed that the on condition of the electromagnetic valve is represented by 0 volt and the off condition is denoted by 24 volts. The parallel-in/serial-out register 14 can identify the initial timing of the serial data signal and supplies a start bit to a terminal STB when a clock pulse becomes identical with a start signal. In this manner, the start signal is transmitted over the synchronous signal transmission wire 15.

Figure 2:
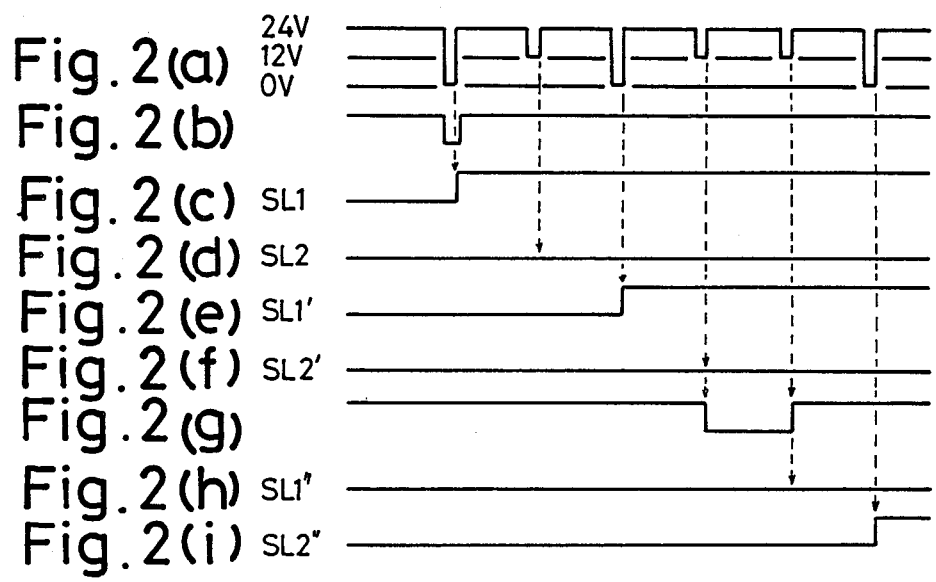
FIGS. 2(a) to 2(i) are signal waveforms for explaining the operation of the apparatus according to the invention.

The serial data signal is produced from a terminal QS of the parallel-in/serial-out register 14 and is gated by an AND gate 10a in synchronism with the clock pulses supplied from the timing generator 12. The signal passing through the AND gate 10a is then amplified by an amplifier 16 to derive the serial control signal shown in FIG. 2(a) in which the on and off conditions of electromagnetic valve are represented by 0 volt and 12 volts, respectively. The serial signal thus derived is supplied through the output signal transmission wire 17 to the synchronous signal receiving circuit 40. The serial signal transmitted over the wire 17 is a composite signal of the clock pulse, serial data signal and solenoid driving signal. FIG. 2(b) illustrates the start signal transmitted over the synchronous signal transmission wire 15. The wire 18 serves as a ground line commonly for the start signal and composite signal. A broken wire 19 represents a power wire of 24 volts by means of which the electromagnetic valves can be made on and off in an emergency stop. It should be noted that this emergency wire 19 is not always necessary and may be dispensed with.

Figure 3:
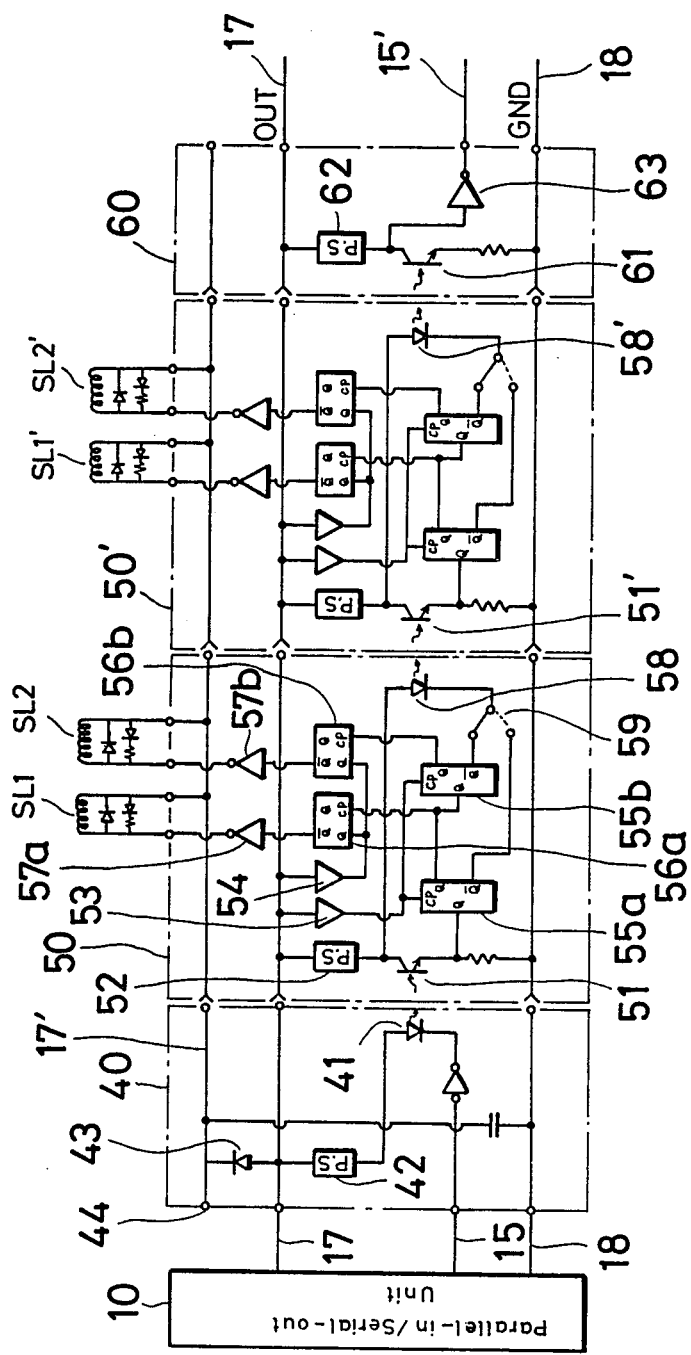
FIG. 3 is a circuit diagram illustrating the manifold.

The synchronous signal receiving circuit 40 is provided at an input side of the manifold. As shown in FIG. 3, the circuit 40 receives the start signal transmitted from the parallel-in/serial-out unit 10 via the synchronous signal transmission wire 15 and converts the start signal photoelectrically into a light signal which is optically coupled with a driver circuit 50. The synchronous signal receiving circuit 40 comprises a light emitting diode 41, a stabilized power supply source(PS) 42 for energizing the light emitting diode and a diode 43. The diode 43 is provided to apply the driving voltage from the wire 17 to the sub-power wire 17'. In order to energize the sub-power wire 17' also from the emergency power wire 19, the sub-power wire is connected to a connector 44. The diode 43 can effectively prevent that noise generated by the solenoid is not transferred into the output signal transmission wire 17. Three wires, i.e. the output signal wire 17, sub-power wire 17' and ground wire 18 are connected to the driver circuit 50.

The driver circuit 50 receives the start signal from the light emitting diode 41 in the synchronous signal receiving circuit 40. Then, two solenoids SL1 and SL2 of a double solenoid type electromagnetic valve are controlled in accordance with the serial data signal supplied over the output signal transmission wire 17. The driver circuit 50 comprises light receiving diode 51, stabilized power source 52, synchronous signal identifying circuit 53, on/off identifying circuit 54, shift registers 55a, 55b, serial/parallel converters 56a, 56b, electromagnetic valve drivers 57a, 57b, and light emitting diode 58.

When the light emitting diode 41 of the synchronous signal receiving circuit 40 emits light in response to the start signal supplied from the parallel-in/serial-out unit 10, the light is made incident upon the light receiving diode 51 which is energized by the stabilized power source 52. Then the diode 52 supplies the start signal to D input terminal of the first shift register 55a. At the same time, the synchronous signal identifying circuit 53 detects the first clock pulse in the serial data signal transmitted over the output wire 17. In this connection, it should serial data signal denotes respective solenoids of the electromagnetic valves. That is to say, the first clock pulse is allotted to the first solenoid SL1, the second clock pulse is allotted to the second solenoid SL2, and so on. When the circuit 53 detects the first clock pulse, it supplies the clock pulse to a CP terminal of the first shift register 55a. Then, the first shift register 55a generates a signal at a Q terminal, which signal is supplied to a CP terminal of the first serial/parallel converter 56a. At the same time, the ON/Off identifying circuit 54 identifies the on/off data for the first solenoid SL1 contained in the serial data signal transmitted over the wire 17. As stated above, the on condition is represented by 0 volt and off condition is dented by 12 volts. The circuit 54 supplies the on/off control signal to the first serial/parallel converter 56a. The converter 56a then supplies from its $\overline{Q}$ terminal a solenoid driving signal shown in FIG. 2(c), which signal is further supplied via the first driver 57a to the first solenoid SL1. In this manner, the first solenoid SL1 is controlled in the on/off control mode.

The second shift register 55b receives the output signal from the Q terminal of the second shift register 55b and the second clock pulse detected by the synchronous signal identifying circuit 53 and supplies the output signal from its $\overline{Q}$ terminal. This output signal is then supplied to the CP terminal of the second serial/parallel converter 56b. At the same time, the on/off identifying circuit 54 supplies the on/off signal for the second solenoid SL2 to the second serial/parallel converter 56b. Then the second serial/parallel converter 56b generates the driving signal for the second solenoid SL2 as illustrated in FIG. 2(d). This driving signal is supplied via the second driving circuit 57b to the second solenoid SL2. In the present example, the driving signal for the second solenoid SL2 is not changed so that the second solenoid does not change its condition.

The second shift register 55b supplies not only the signal from its Q terminal to the second serial/parallel converter 56b, but also the signal from its $\overline{Q}$ terminal to the light emitting diode 58 which generates the start signal for the next electromagnetic valve. It should be noted that the light produced by the light emitting diode 58 also serves as the end signal of the relevant driver circuit 50.

The second driver circuit 50' has the same construction as that of the first driver circuit 50 and is arranged on the second electromagnetic valve of the manifold system.

These driving circuits 50 and 50' are coupled with each other by means of only three wires 17, 17' and 18 so that the wiring operation is very easy. The third and fourth solenoids SL1' and SL2' are controlled by the second driver circuit 50' in the same manner as that explained above in connection with the first driver circuit 50. FIGS. 2(e) and 2(f) show the driving signals for the solenoids SL1' and SL2'.

The driver circuits 50 and 50' can be used not only for the double solenoid type electromagnetic valve, but also for the single solenoid type electromagnetic valve. For this purpose, there is arranged a switch 59 in the driver circuit 50. In case of using the single solenoid type, the switch 59 is connected to the $\overline{Q}$ terminal of the first shift register 55a, and when the double solenoid type is used, the switch is connected to the $\overline{Q}$ terminal of the second shift register 55b.

At the output of the manifold, there is arranged a synchronous signal transmitting circuit 60. When the light emitted by the light emitting diode 58' of the last driver circuit 50' is received by the synchronous signal transmitting circuit 60, the circuit transmits the signal to a next manifold as a start signal via a second synchronous signal transmitting wire 15'. These manifolds are coupled with each other by means of three wires, i.e. second synchronous signal transmitting wire 15', output signal transmission wire 17 and ground wire 18. The synchronous signal transmitting circuit 60 comprises light receiving diode 61, stabilized power source 62, and start signal driver 63. When the light receiving diode 61 receives the light emitted from the last driver circuit 50', the diode converts the light into an electric signal which is then amplified by the start signal driver 63 to derive the start signal shown in FIG. 2(g). The thus produced start signal is supplied to a next manifold. The start signal is supplied from the synchronous signal transmitting circuit 60 via the second synchronous signal transmission wire 15' to the next manifold. Figs. 2(h) and 2(g) illustrate the driving signals for first and second solenoids SL1" and SL2", respectively.

FIG. 4 shows schematically the general construction of the control apparatus for the manifold type electromagnetic valve according to the invention. The parallel-in/serial-out unit 10 and a plurality of manifolds 70 are coupled with each other by means of only three wires, i.e. synchronous signal transmission wire 15, output signal transmission wire 17 and ground wire 18.

FIG. 5 is a schematic view showing a second embodiment of the manifold control apparatus according to the invention. In the present embodiment, the output signal transmission wire 17, sub-power wire 17' and ground wire 18 are parallelly connected between the synchronous signal receiving circuit 40 and a plurality of driver circuits 50, 50' and synchronous signal transmitting circuit 60 via connectors. In the present embodiment, the driver circuits 50 and 50' for the electromagnetic valve can be simply connected to the bus including the output signal transmission wire 17, sub-power wire 17' divided from the wire 17 and the ground wire 18. Therefore, the number of the connectors can be reduced compared with the previous embodiment.

As explained above in detail, in the manifold electromagnetic valve controlling apparatus according to the invention, a plurality of manifolds are coupled with each other by means of three wires, i.e. the output signal transmission wire for transmitting the composite signal of serial data signal, clock pulse and driving voltage, the synchronous signal transmission wire, and the ground wire, so that the wiring operation can be made very simple. Moreover, the position of malfunction can be found easily and the manifold system can be repaired within a short time period. Since the driving voltage is superimposed on the serial data signal and the clock pulse, the influence of external noise can be reduced. Further, on each manifold it is sufficient to provide only the synchronous signal receiving and transmitting circuits and the electromagnetic valve contains therein the driver circuit having the serial-parallel converting function, the manifold can be made small in size compared with the known manifold in which the serial-parallel conversion is effected. In case of controlling a number of electromagnetic valves by connecting a plurality of manifold type electromagnetic valves, it is sufficient to connect the manifolds by means of the three wires, and thus the wiring can be carried out effectively. Further, the number of manifolds can be increased easily.

What is claimed is:

1. An apparatus for controlling a plurality of electromagnetic valves of manifold type comprising:
    means for generating parallel control signals for a plurality of electromagnetic valves;
    a constant voltage source for producing a constant voltage;
    a parallel-in/serial-out unit for converting said parallel control signals into a serial data signal and generating a composite control signal including said serial data signal, a start synchronous signal synchronized with said serial data signal and a driving voltage formed from said constant voltage;
    at least one synchronous signal receiving circuit arranged on a manifold, said synchronous signal receiving circuit generating a start signal in response to said control start synchronous signal supplied from said parallel-in/serial-out unit;
    a plurality of driver circuits each arranged on respective electromagnetic valves, a first driver circuit receiving said start signal supplied from said synchronous signal receiving circuit to convert the serial control signal into parallel control signals for driving the relevant electromagnetic valves and after driving the electromagnetic valves, said driver circuit producing an end signal;
    at least one synchronous signal transmitting circuit arranged on said manifold, said synchronous signal transmitting circuit receiving said end signal and supplying the synchronous signal; and
    means for transmitting the composite signal, start signal, end signal and synchronous signal among said parallel-in/serial-out unit, synchronous signal receiving circuit and synchronous signal transmitting circuit.

2. An apparatus according claim 1, wherein said transmitting means comprises an output signal transmission wire for transmitting said composite signal and a ground wire, and a synchronous signal transmission means for transmitting said synchronous signal.

3. An apparatus according to claim 2, wherein said transmitting means comprises a synchronous signal transmission wire for transmitting the synchronous signal from the parallel-in/serial-out unit to the synchronous signal receiving circuit.

4. An apparatus according to claim 3, wherein said synchronous signal receiving circuit comprises a light emitting diode for generating said start signal, said driver circuit comprises a light receiving diode for receiving said start signal transmitted from said light emitting diode of the synchronous signal receiving circuit and a light emitting diode for generating said end signal, and said synchronous signal transmitting circuit comprises a light receiving diode for receiving the end signal transmitted from said light transmitting diode of the driver circuit.

5. An apparatus according to claim 4, wherein said synchronous signal receiving circuit comprises a sub-power wire which is coupled with said output signal transmission wire via a diode, and said driver circuit comprises a sub-power wire connected to said sub-power wire of the synchronous signal receiving circuit.

6. An apparatus according to claim 4, wherein said driver circuit comprises a switch for selecting a single solenoid type electromagnetic valve and a double solenoid type electromagnetic valve.

7. An apparatus according to claim 3, wherein said synchronous receiving circuit, driver circuit and synchronous transmitting circuit are formed as a set and a plurality of sets are connected in series with each other by means of said output signal transmission wire, synchronous signal transmission wire and ground wire.

8. An apparatus according to claim 5, wherein said output signal transmission wire, sub-power wire and ground wire are formed as a bus and a plurality of driver circuits and the synchronous signal transmitting circuit are parallelly coupled with said bus.

* * * * *